(12) United States Patent
Schedler et al.

(10) Patent No.: US 6,467,789 B1
(45) Date of Patent: Oct. 22, 2002

(54) TOWABLE PALLET JACK

(76) Inventors: Scott I. Schedler, 8045 W. Cascade Dr., Franklin, WI (US) 53132; Glenn F. Minnick, 3301 E. Thompson Ave., St. Francis, WI (US) 53235; Stanley B. Tyler, N106 W16186 Fieldstone Pass, Germantown, WI (US) 53022

( * ) Notice: Subject to any disclaimer, the term of this patent is extended or adjusted under 35 U.S.C. 154(b) by 15 days.

(21) Appl. No.: 09/839,455

(22) Filed: Apr. 20, 2001

(51) Int. Cl.$^7$ ................................................ B60D 1/00
(52) U.S. Cl. ...................... 280/408; 280/481; 280/495; 280/511
(58) Field of Search .......................... 280/408, 406.1, 280/411.1, 511, 514, 515, 456.1, 501, 481, 495; 414/607, 608, 495

(56) References Cited

U.S. PATENT DOCUMENTS 3,207,085 A * 9/1965 Burr ........................... 105/72.2
4,287,966 A * 9/1981 Frees ........................ 180/14.1
6,135,701 A * 10/2000 Galloway, Sr. ........... 280/415.1

\* cited by examiner

Primary Examiner—Kevin Hurley
(74) Attorney, Agent, or Firm—Donald J. Ersler

(57) ABSTRACT

A towable pallet jack includes a pallet jack, a hitch pump handle, a removable male hitch, and a handle portion. The hitch pump handle extends from a pump unit at a rear of the pallet jack. A locking cavity is formed on the other end of the hitch pump handle and is sized to receive a hitch ball. The removable male hitch is inserted into the pair of forks. A second embodiment of the towable pallet jack utilizes a scissors pallet jack with a pivotal hitch attached to a rear of the pallet jack. A third embodiment of the towable pallet jack includes a pallet jack and hitch pump handle. The hitch pump handle is offset such that thereof may be attached to a fork of a succeeding pallet jack. A fourth embodiment of the towable pallet jack uses a straight hitch pump handle which is pivotally attached to a rear of the pallet jack at one side thereof. A fifth embodiment of the towable pallet jack including a female swinging hitch and a hitch pump handle with a expandable male hitch.

4 Claims, 8 Drawing Sheets

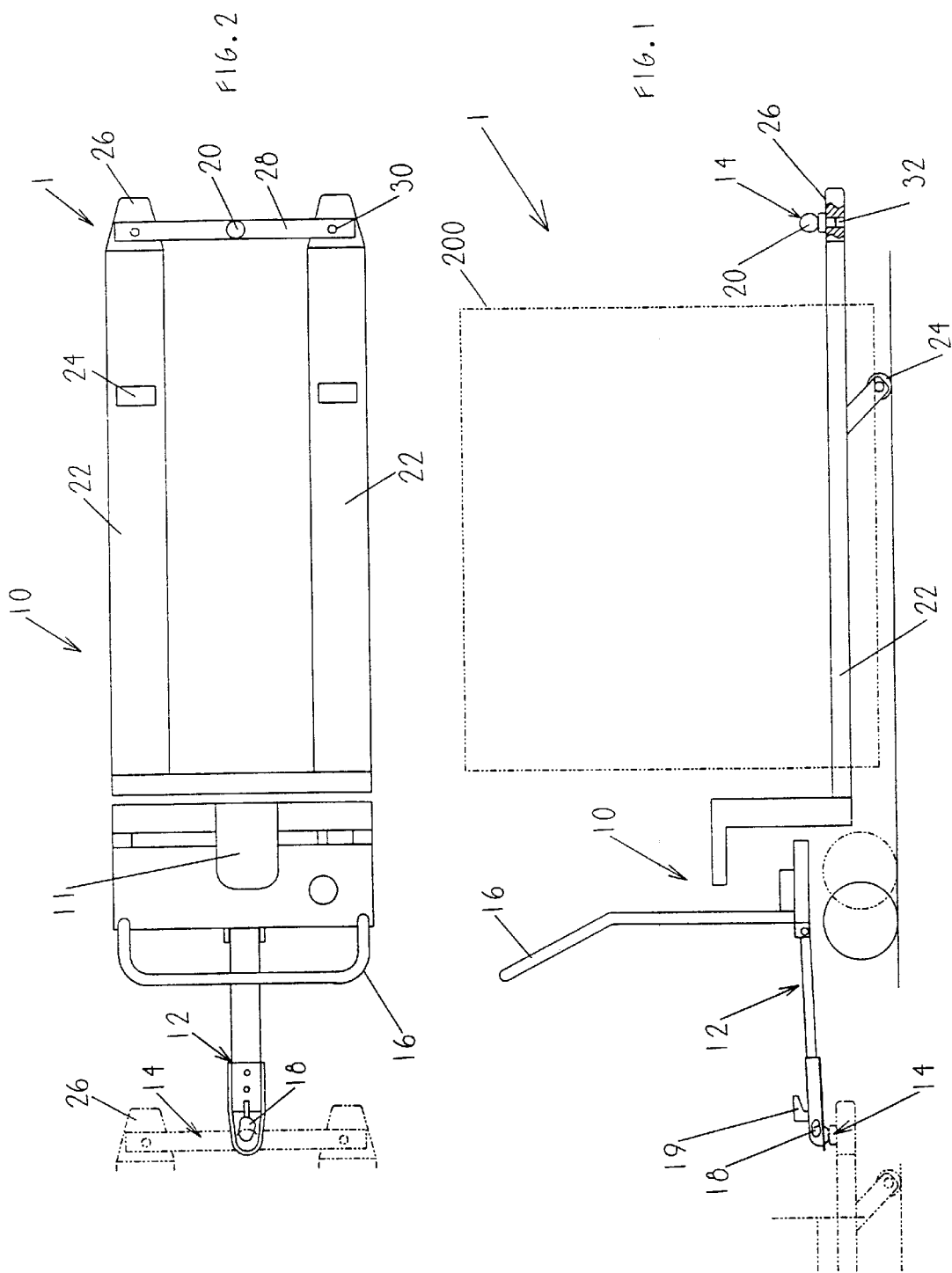

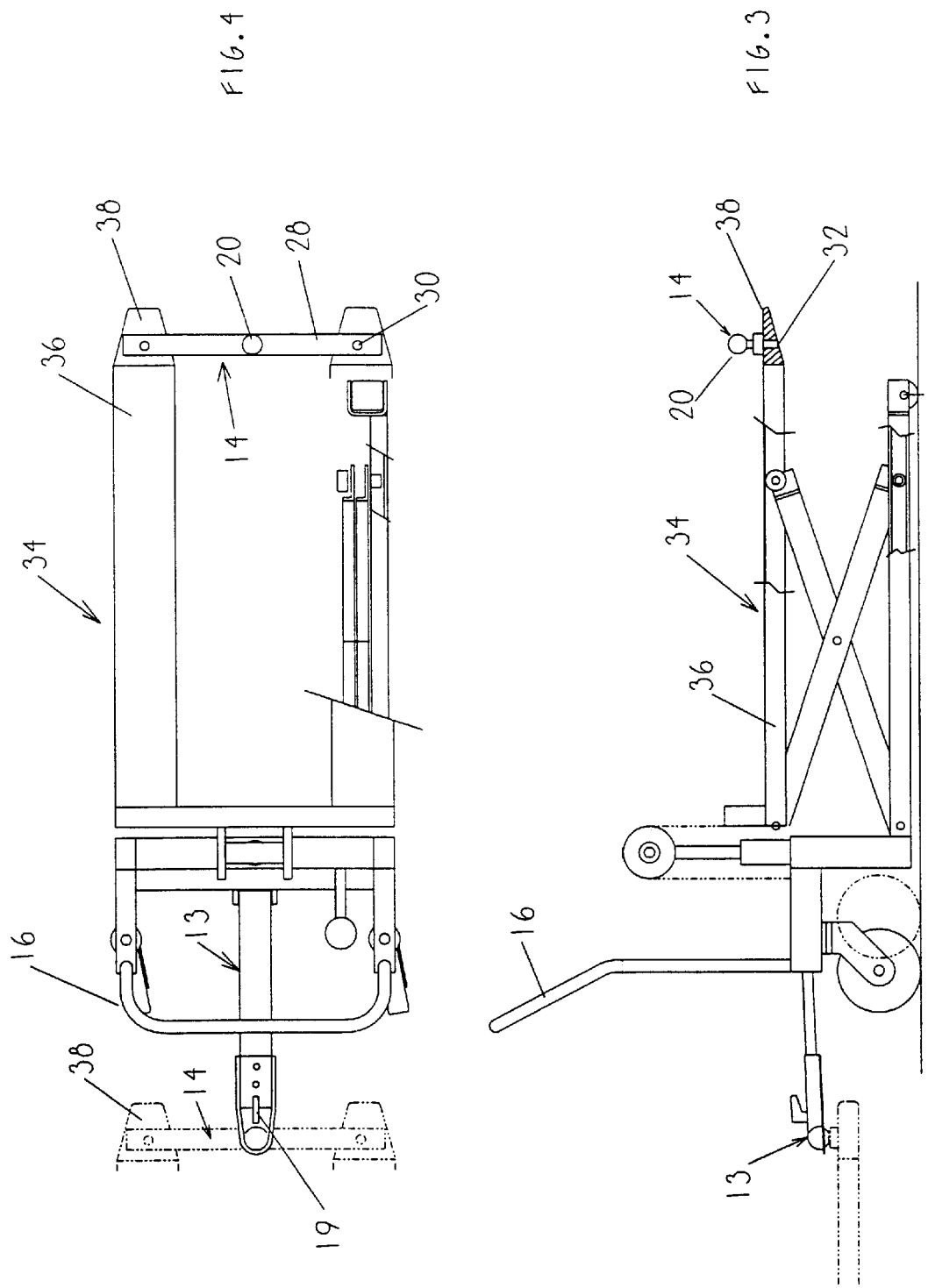

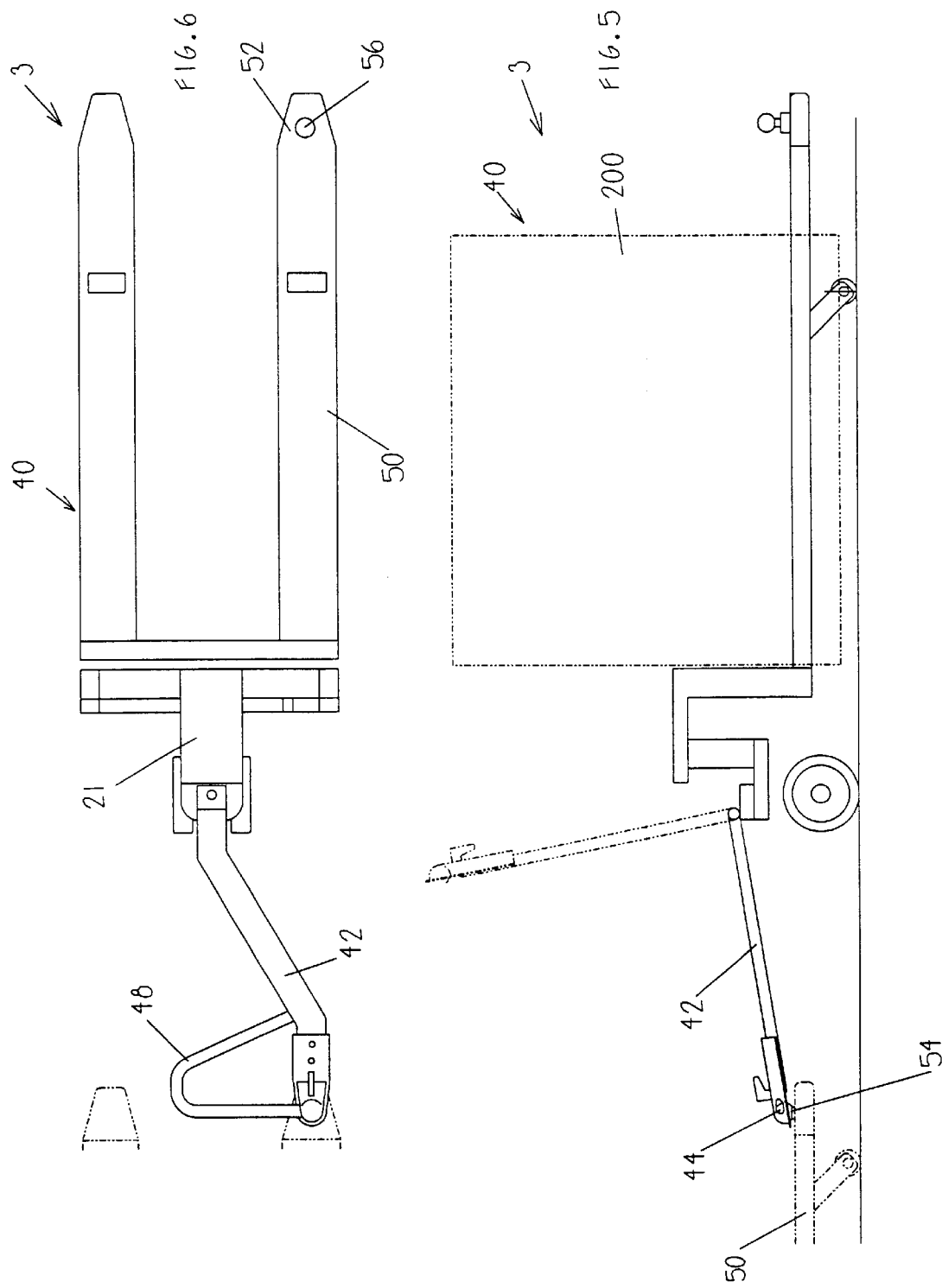

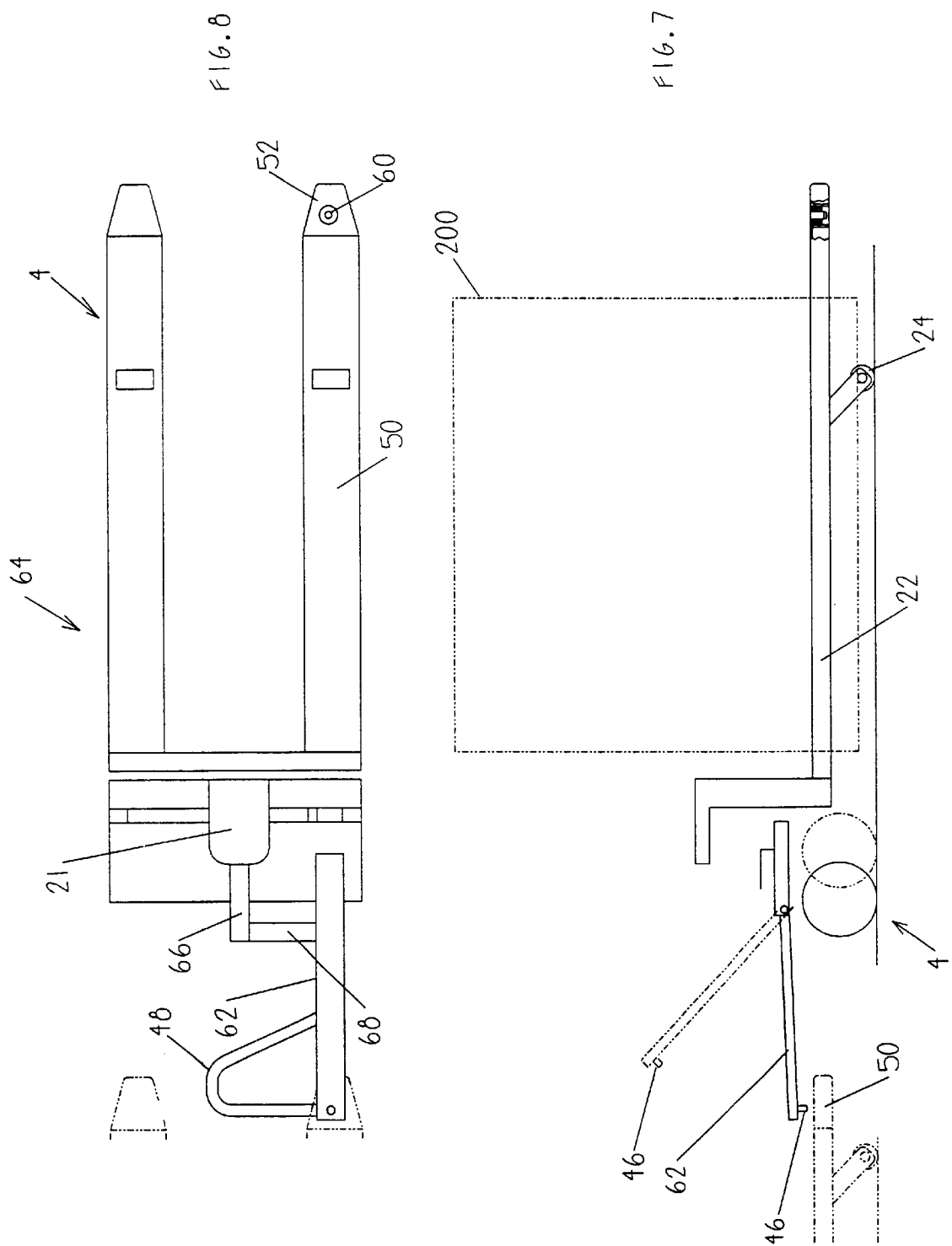

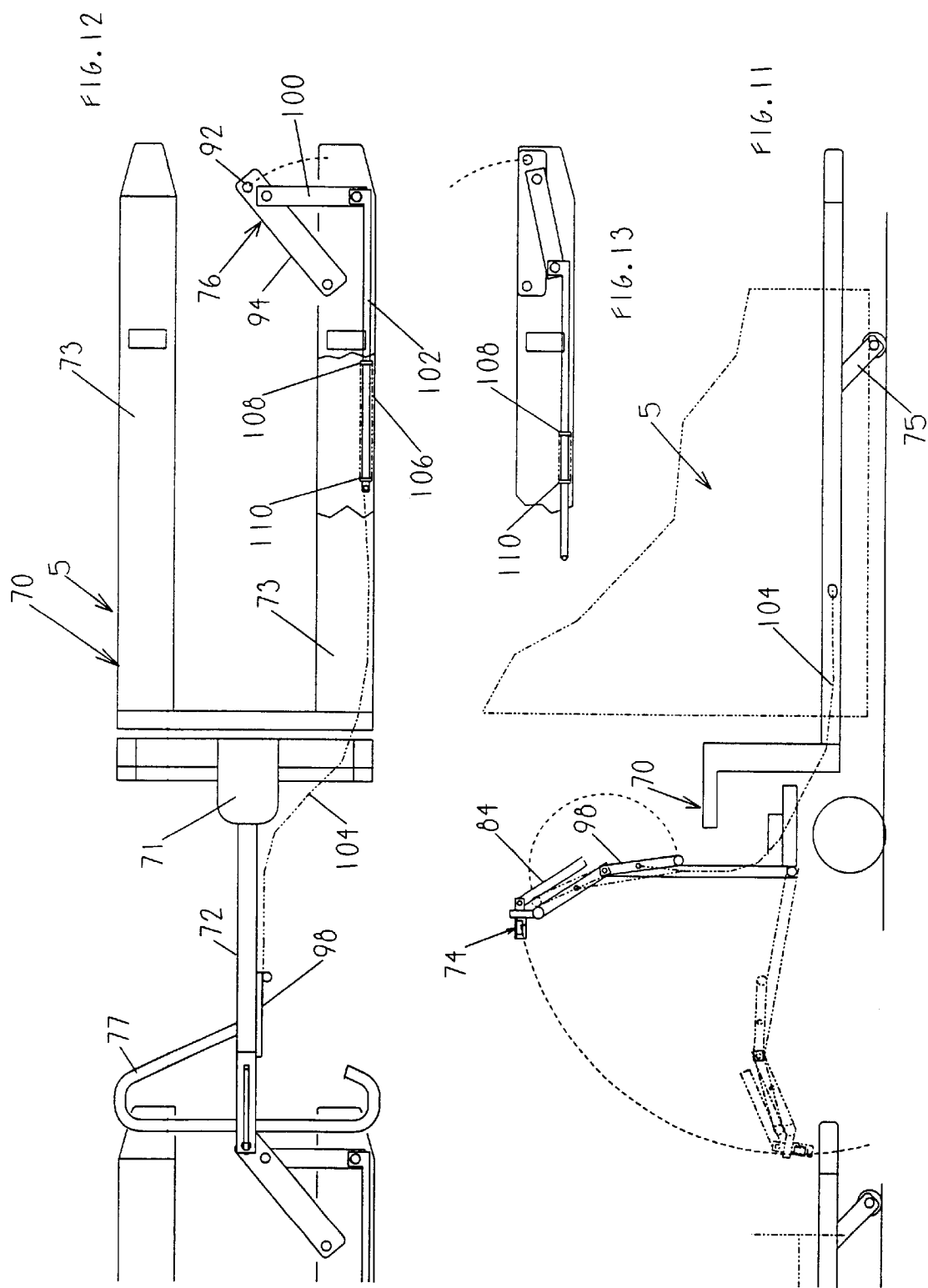

TOWABLE PALLET JACK

BACKGROUND OF THE INVENTION

1. Field of the Invention

The present invention relates generally to pallet jacks and more specifically to a towable pallet jack which may be towed in a train with other towable pallet jacks.

2. Discussion of the Prior Art

Currently, the movement of bulk type materials in many manufacturing and warehousing facilities is performed by forklifts. Forklifts are large, hard to maneuver, and pose considerable threat to pedestrian traffic within the facility. There are numerous accidents as a result of using forklifts.

Accordingly, there is a clearly felt need in the art for a towable pallet jack which may be towed in a train, increases the amount of material transferred by a single individual, and reduces the amount of accidents in facilities due to forklift accidents.

SUMMARY OF THE INVENTION

The present invention provides a towable pallet jack which enables a large quantity of material to be transferred between locations with greater efficiency and safety. The towable pallet jack includes a pallet jack, a hitch pump handle, a removable male hitch, and a handle portion. One end of the hitch pump handle extends from a pump unit at a rear of the pallet jack. A locking cavity is formed on the other end of the hitch pump handle and is sized to receive a hitch ball. The hitch pump handle is used as a hitch to attach to another pallet jack and a pump handle to lift the pallet forks. Forks of the pallet jack are extended beyond the pivotal wheels to provide a mounting surface for the removable mounting of the removable male hitch. The removable male hitch includes the hitch ball, a hitch bar, and a pair of retention pins. The male hitch is disposed in a middle of the hitch bar on a top thereof. A retention hole is formed in the mounting surface of each fork to receive the retention pins. The pair of retention pins extend from a bottom of the hitch bar and are located to be received by a pair of retention holes. A second embodiment of the towable pallet jack utilizes a scissors pallet jack. A pivotal hitch is used instead of the hitch pump handle, because the forks are not lifted by manual pumping.

A third embodiment of the towable pallet jack includes a pallet jack and hitch pump handle. One end of the hitch pump handle is pivotally attached to a pump unit at a rear of the pallet jack and a locking cavity is formed in the other end thereof. The locking cavity is sized to receive a removable hitch ball. A handle portion is also formed on the other end of the hitch pump handle. The pump unit is located in a middle at the rear of the pallet jack and the hitch pump handle is offset such that the other end is attachable to the removable hitch ball on one of the forks.

At least one of the forks of the pallet jack is extended beyond the pivotal wheel to provide a mounting surface for the removable mounting of the removable hitch ball. A locking pin may be substituted for the locking cavity and preferably a swivel bushing formed in the mounting area instead of the retention hole. The pivot pin extends downward from the hitch pump handle for insertion into the swivel bushing. A fourth embodiment of the towable pallet jack uses a straight hitch pump handle which is pivotally attached to a rear of the pallet jack at one side thereof.

A fifth embodiment of the towable pallet jack includes a pallet jack, hitch pump handle, expandable male hitch, and a female actuating hitch. One end of the hitch pump handle extends from a pump unit at a rear of the pallet jack. The expandable male hitch is formed on the other end of the hitch pump handle and is sized to be inserted into the female actuating hitch. The expandable male hitch has an expansion lever which is pivoted to lock the expandable male hitch into a hitch opening in the female actuating hitch. The hitch pump handle is also used as a pump handle to lift the pallet forks.

The female actuating hitch includes a swinging hitch member and an actuation lever. At least one of the forks of the pallet jack is extended beyond the pivotal wheels to provide an area for retaining the female actuating hitch. The swinging hitch is disposed in the extended area of one of the forks. The hitch opening is disposed in an end of the swinging hitch member. The actuation lever is pivotally attached to the hitch pump handle. The actuation lever is pivoted through a linkage system to swing the swinging hitch member outward to receive the expandable male hitch.

A train of towable pallet trucks are connected to each other by capturing the hitch ball with a hitch handle or inserting the pivot pin into a swivel bushing. The plurality of towable pallet jacks may be transported under their own power or towed buy a stand alone motorized device. After the towable pallet trucks reach their destination, they are separated from each other, and the pallets removed with conventional means.

Accordingly, it is an object of the present invention to provide a towable pallet jack which may be towed in a train.

It is a further object of the present invention to provide a towable pallet jack which increases the amount of material transferred by a single individual.

Finally, it is another object of the present invention to provide a towable pallet jack which reduces the amount of accidents in facilities due to forklift accidents.

These and additional objects, advantages, features and benefits of the present invention will become apparent from the following specification.

BRIEF DESCRIPTION OF THE DRAWINGS

FIG. 1 is a side view of a towable pallet jack in accordance with the present invention.

FIG. 2 is a top view of a towable pallet jack in accordance with the present invention.

FIG. 3 is a side view of a second embodiment of a towable pallet jack in accordance with the present invention.

FIG. 4 is a top view of a second embodiment of a towable pallet jack in accordance with the present invention.

FIG. 5 is a side view of a third embodiment of a towable pallet jack in accordance with the present invention.

FIG. 6 is a top view of a third embodiment of a towable pallet jack in accordance with the present invention.

FIG. 7 is a side view of a fourth embodiment of a towable pallet jack in accordance with the present invention.

FIG. 8 is a top view of a fourth embodiment of a towable pallet jack in accordance with the present invention.

FIG. 11 is a side view of a fifth embodiment of a towable pallet jack in accordance with the present invention.

FIG. 12 is a top view of a fifth embodiment of a towable pallet jack in accordance with the present invention.

FIG. 13 is a top view of a swinging hitch of a fifth embodiment of a towable pallet jack in accordance with the present invention.

DETAILED DESCRIPTION OF THE PREFERRED EMBODIMENTS

Figure 9:
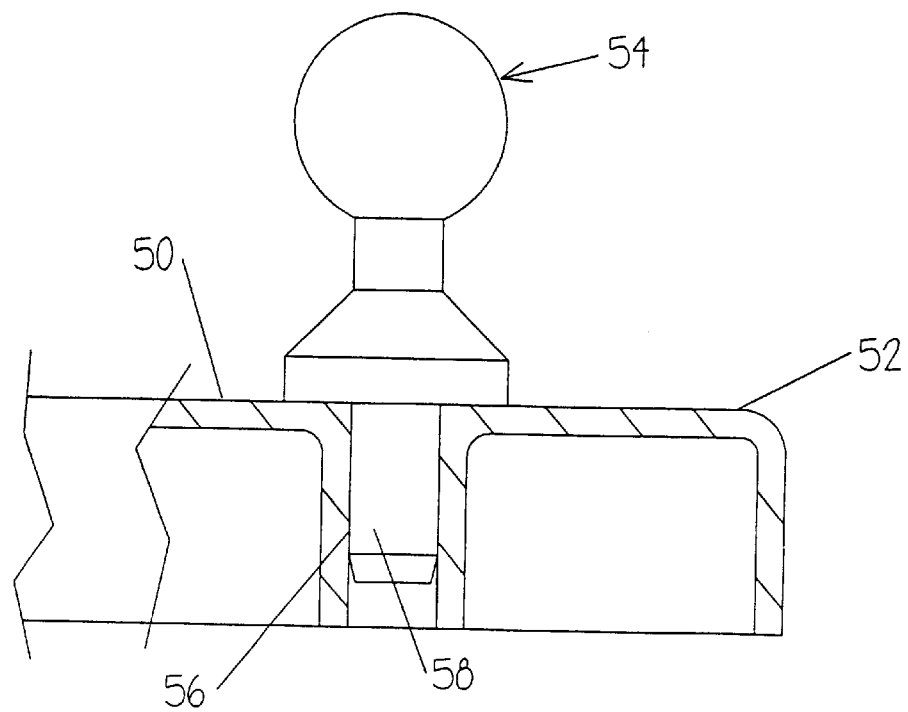
FIG. 9 is an enlarged cross sectional view of a removable hitch ball retained in a fork of a pallet jack in accordance with the present invention.

With reference now to the drawings, and particularly to FIG. 1, there is shown a side view of a towable pallet jack 1. With reference to FIG. 2, the towable pallet jack 1 includes a pallet jack 10, a hitch pump handle 12, a removable male hitch 14, and a handle portion 16. One end of the hitch pump handle 12 extends from a pump unit 11 at a rear of the pallet jack 10 and a locking cavity 18 is formed on the other end thereof and is sized to receive a hitch ball 20. The locking cavity 18 is locked on to the hitch ball 20 by actuating a locking switch 19. The details of locking cavities are well known in the art. The hitch pump handle 12 is used as a hitch to attach to another pallet jack and a pump handle to lift the forks 22 of the pallet jack 10. The forks 22 extended beyond pivotal wheels 24 to provide a mounting surface 26 for the removable mounting of the removable male hitch 14. The removable male hitch 14 includes the hitch ball 20, a hitch bar 28, and a pair of retention pins 30. The hitch ball 20 is disposed in a middle of the hitch bar 28 on a top thereof. A retention hole 32 is formed in the mounting surface 26 of each fork 22 to receive the retention pins 30. The pair of retention pins extend from a bottom of the hitch body and are located to be received by the pair of retention holes 32. The retention pins 30 may be modified to lock into the retention holes 32.

With reference to FIGS. 3 and 4, a towable pallet jack 2 includes a pallet jack 34, a pivotal hitch 13, the removable male hitch 14, and the handle portion 16. One end of the pivotal hitch pump 13 is pivotally attached to the rear of the pallet jack 34 and a locking cavity 18 is formed on the other end thereof and is sized to receive a hitch ball 20. The length of forks 36 of the pallet jack 34 are extended beyond their normal length to provide a mounting surface 38 for the removable mounting of the removable male hitch 14. The removable male hitch 14 includes the hitch ball 20, the hitch bar 28, and the pair of retention pins 30. The male hitch 14 is disposed in a middle of the hitch bar 28 on a top thereof. The retention hole 32 is formed in the mounting surface 38 of each fork 34 to receive the retention pins 30. The pair of retention pins 30 extend from the bottom of the hitch body 28 and are located to be received by a pair of retention holes 32. The retention pins 30 may be modified to lock into the retention holes 32.

In use the towable pallet jacks 1 & 2 are preferably used in the following manner. The forks 22 or 36 of the pallet jack 10 or 34 are slid under a load 200. The removable male hitch 14 is attached to the mounting surfaces 26 or 38. The hitch pump handle 12 or the pivotal hitch 13 is attached to the removable male hitch 14. A plurality of pallet jacks 10 or 34 may now be towed.

With reference to FIGS. 5 & 6, a towable pallet jack 3 includes a pallet jack 40 and a hitch pump handle 42. One end of the hitch pump handle 42 extends from a pump unit 21 at a rear of the pallet jack 40 and a locking cavity 44 is formed on the other end thereof as shown in FIGS. 5 & 6. Alternatively, a pivot pin 46 may be formed on the other end of the hitch pump handle 42 as shown in FIGS. 7 & 8. A handle portion 48 is also formed on the other end of the hitch pump handle 42. The hitch pump handle 42 is offset such that thereof may be pivotally attached to the pump unit 21.

Figure 10:
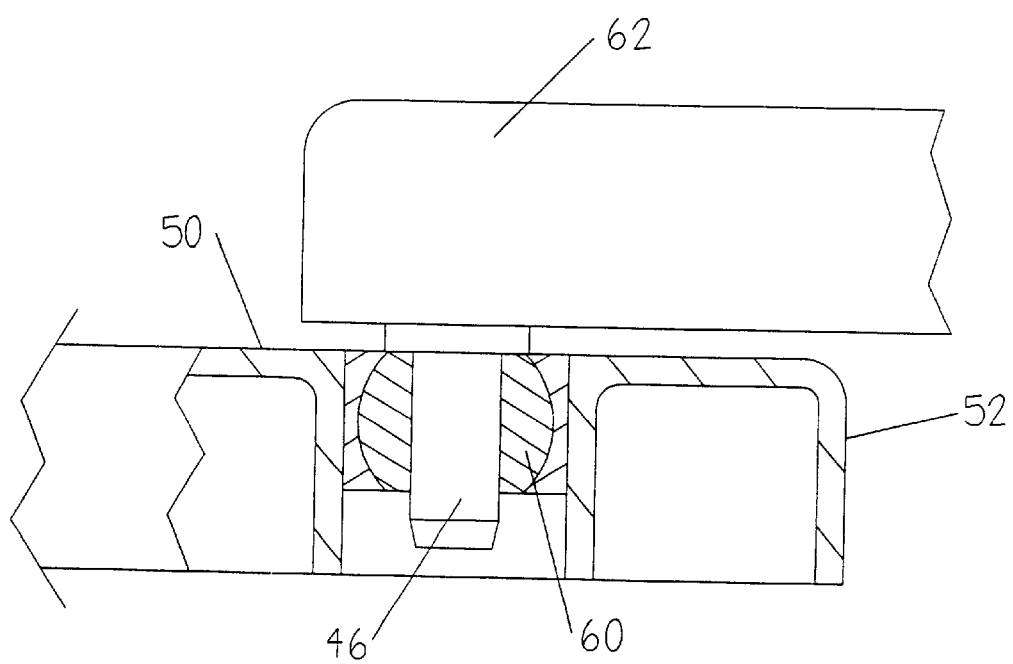
FIG. 10 is an enlarged cross sectional view of a pivot pin retained in a fork of a pallet jack in accordance with the present invention.

At least one fork 50 of the pallet jack 40 is extended beyond its normal length to provide a mounting surface 52 for the removable mounting of the removable ball hitch 54. With reference to FIG. 9, a retention hole 56 is formed in the mounting surface 52 to receive a retention shank 58 of the ball hitch 54. The retention hole 56 and/or retention shank 58 may be modified to lock into the retention shank 58 into the retention hole 56. With reference to FIG. 10, preferably a swivel bushing 60 is formed in the mounting surface 52. The pivot pin 46 is inserted into the swivel bushing 60. It is preferably to use the swivel bushing 60 instead a regular bushing, because the heights of the fork 50 and hitch pump handle 62 may not always be the same. Damage to the pivot pin 46 would occur if the heights did vary. The swivel bushing 60 and/or the pivot pin 46 may be modified to lock the pivot pin in the swivel bushing 60.

A towable pallet jack 4 includes a pallet jack 64 and a hitch pump handle 62. One end of the hitch pump handle 62 is pivotally attached to the rear of the pallet jack 64 on one side thereof. A pump handle 66 extends from the pump unit 21. Preferably, a connection member 68 is attached to the pump handle 66 and the hitch pump handle 62. The pump unit 21 may be activated by pumping the hitch pump handle 62. A pivot pin 46 is formed on the other end of the hitch pump handle 62. Alternatively, the locking cavity 44 and the removable ball hitch 54 may be substituted for the pivot pin 46 and swivel bushing 60. At least one fork 50 of the pallet jack 64 is extended beyond its normal length to provide a mounting surface 52 for the swivel bushing 60. The pivot pin 46 extending from the hitch pump handle 62 is inserted into the swivel bushing 60.

In use the towable pallet jacks 3 & 4 are preferably used in the following manner. The forks 50 of the pallet jack 40 or 64 are slid under a load 200. The hitch pump handle 42 or 62 is attached to the removable hitch ball 54 or inserted into the swivel bushing 60, respectively. A plurality of pallet jacks 40 or 64 may now be towed.

With reference to FIGS. 11–13, a fifth embodiment of the towable pallet jack 5 includes a pallet jack 70, hitch pump handle 72, expandable male hitch 74, and a female actuating hitch 76. One end of the hitch pump handle 72 extends from a pump unit 71 at a rear of the pallet jack 70. The expandable male hitch 74 is formed on the other end of the hitch pump handle 72 and is sized to be inserted into the female actuating hitch 76. A handle portion 77 is preferably attached to the other end of the hitch pump handle 72. With reference to FIGS. 14–17, the expandable male hitch 74 includes a hitch body 78, a pair expansion of fingers 80, an expanding plug 82, an expansion lever 84, and push plug 86. The pair of expansion fingers 80 are pivotally attached to the hitch body 78. The expanding plug 82 is placed between the pair of expansion fingers 80. The push plug 86 is contained within a bore formed in the hitch body 78. Preferably, a face plate 90 is attached to a front of the hitch body 78 to retain the expansion fingers 80 and expanding plug 82.

Figure 15:
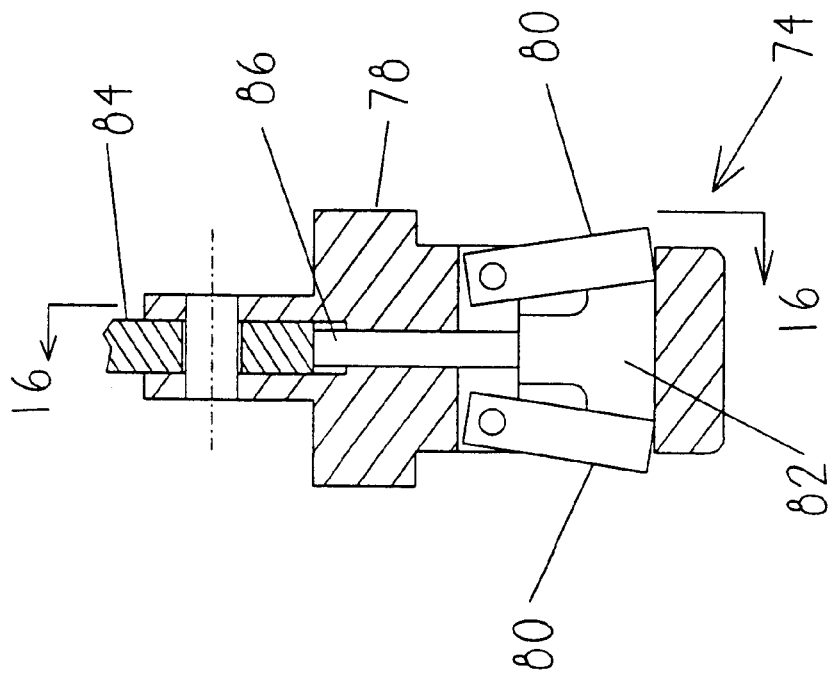
FIG. 15 is a front cross sectional view of a expandable male hitch in an expanded position of a fifth embodiment of a towable pallet jack in accordance with the present invention.
Figure 14:
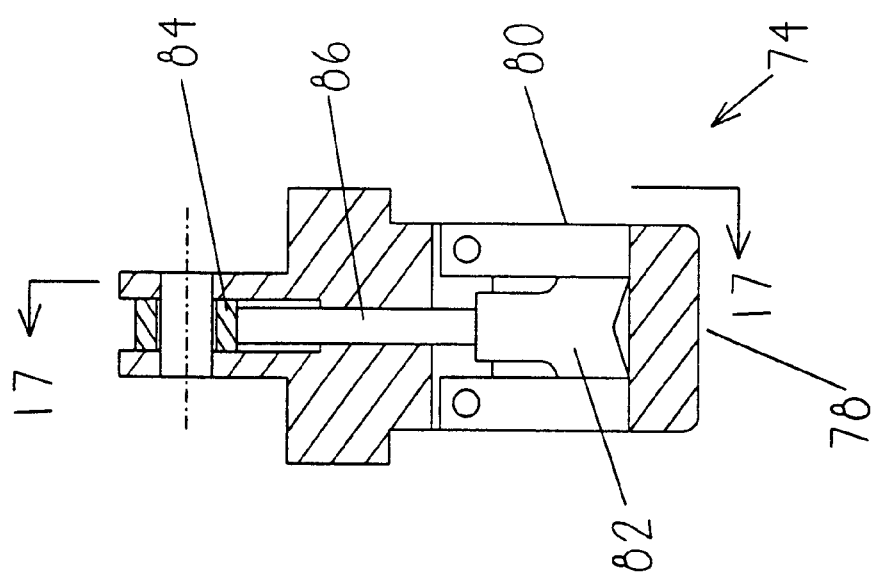
FIG. 14 is a front cross sectional view of a expandable male hitch in an unexpanded position of a fifth embodiment of a towable pallet jack in accordance with the present invention.
Figure 17:
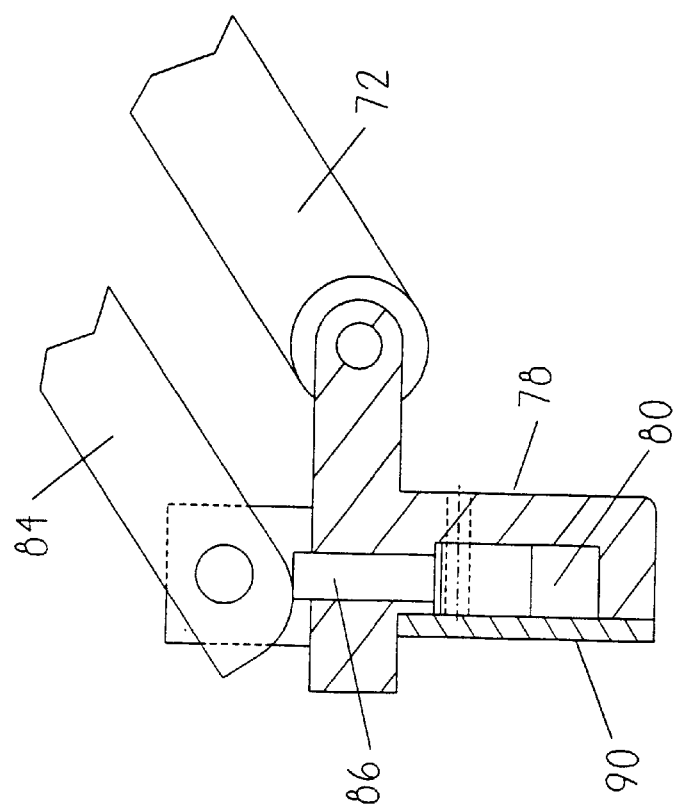
FIG. 17 is a side cross sectional view of a expandable male hitch in an expanded position of a fifth embodiment of a towable pallet jack in accordance with the present invention.
Figure 16:
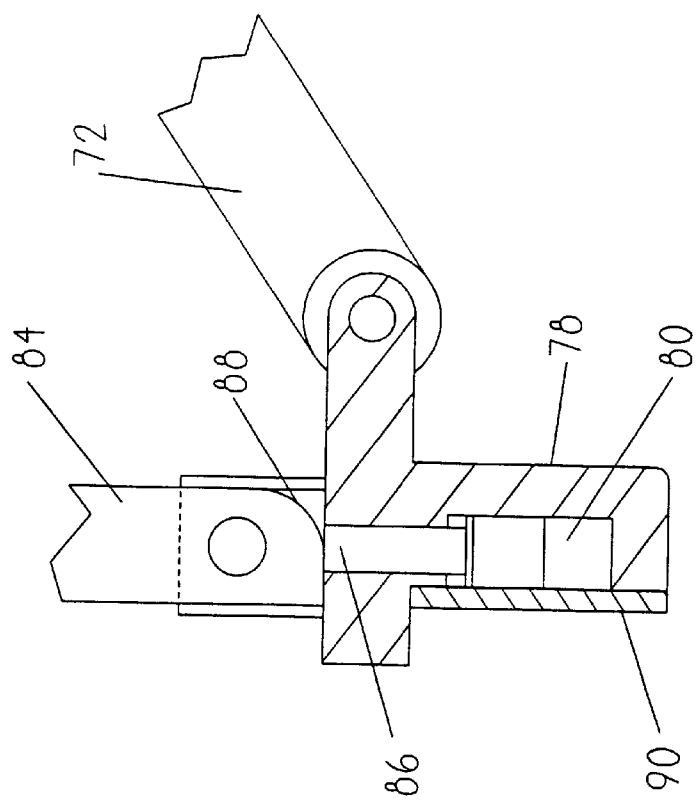
FIG. 16 is a side cross sectional view of a expandable male hitch in an expanded position of a fifth embodiment of a towable pallet jack in accordance with the present invention.

The expansion lever 84 is pivotally attached to a top of the hitch body 78. A cam surface 88 is formed on one end of the expansion lever 84 to force the push plug 86 downward when thereof is rotated. FIGS. 15 and 17 show that the expansion fingers 80 are in a locking position when the expansion lever 84 is in a vertical position. However, the cam surface 88 may be formed such that the expansion fingers are in a locking position when the expansion lever 84 is nearly horizontal. The expansion lever 84 is pivoted to force the push plug 86 against the expanding plug 82 which is pivoted to lock the expandable male hitch 74 into a hitch opening 92 in the female actuating hitch 76. The hitch pump handle 72 is also used as a pump handle to lift forks 73 of the pallet jack 70.

The female actuating hitch 76 includes a swinging hitch member 94, a linkage system 96, and an actuation lever 98. The forks 73 of the pallet jack 70 are extended beyond the pivotal wheels 75 to provide an area for retaining the female actuating hitch 76. The swinging hitch member 94 is pivotally retained within the extended area of one of the forks 73. The linkage system 96 preferably includes a pivot arm 100, a pivot rod 102, and a pull cable 104. One end of the pivot arm 100 is pivotally attached to the swinging hitch member 94 and the other end is pivotally attached to one end of the pivot rod 102. The pivot rod 102 is slidably attached to the fork with any suitable method. A compression spring 106 is placed over the pivot rod 102. A spring sleeve 108 is formed on the pivot rod 102 and a spring block 110 is attached to the fork 73. The swinging hitch member 94 is swung into position by pivoting the actuation lever 98. The spring 106 forces pivot rod 102 to push the swinging hitch member 94 outward. The other end of the pivot rod 102 is attached to one end of the pull cable 104. The other end of the pull cable 104 is attached to the actuation lever 98. The actuation lever 98 is pivotally attached to the hitch pump handle 72.

In use the towable pallet jack 5 is preferably used in the following manner. The forks 73 of the pallet jack 70 are slid under a load 200. The female actuating hitch 76 is swung into position by pivoting the actuation lever 98. The hitch pump handle 72 is swung downward such that the expandable male hitch 74 is inserted into the opening 92. The expandable male hitch 74 is locked in the opening 92 by pivoting the expansion lever 84. A plurality of pallet jacks 70 may now be towed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A towable pallet jack comprising:

a pallet jack having a pair of forks at a front thereof;

a removable male hitch being removably attachable to an end of said pair of forks; and a pivotal hitch having one end pivotally attached to a rear of said pallet jack and the other end thereof being pivotally attachable to said removable male hitch.

2. The towable pallet jack of claim 1, further comprising:

a handle portion being attached to a rear of said pallet jack.

3. The towable pallet jack of claim 1, further comprising:

said removable male hitch including a hitch ball, a hitch bar, and a pair of locking pins, a retention hole being formed at an end of each said fork, said retention hole being sized to receive a single said locking pin.

4. The towable pallet jack of claim 1, further comprising:

said pivotal hitch having a locking cavity formed on the other end, said locking cavity being sized to receive said hitch ball.

* * * * *